United States Patent [19]
Guthrie et al.

[11] Patent Number: 4,786,086
[45] Date of Patent: Nov. 22, 1988

[54] FUEL CELL STACK ELECTRICALLY INSULATED FLUID CONNECTOR

[75] Inventors: Robin J. Guthrie, East Hartford; Anthony P. Mientek, Glastonbury, both of Conn.

[73] Assignee: International Fuel Cells Corporation, South Windsor, Conn.

[21] Appl. No.: 121,028

[22] Filed: Nov. 16, 1987

[51] Int. Cl.⁴ .................... F16L 11/12; F16L 21/00
[52] U.S. Cl. ............................ 285/49; 285/54; 285/382.1; 285/382.5; 429/34
[58] Field of Search ............ 165/47; 285/49, 54, 285/382, 382.1, 382.4, 382.5, 223; 429/34

[56] References Cited

U.S. PATENT DOCUMENTS

| | | | |
|---|---|---|---|
| 1,320,731 | 11/1919 | Bown | 285/54 |
| 3,556,567 | 1/1971 | O'Connor | 285/382 |
| 3,686,747 | 8/1972 | Bagnulo | 285/382 |
| 4,174,124 | 11/1979 | Dockree | 285/54 |
| 4,192,534 | 3/1980 | Bernatt et al. | 285/382.5 |
| 4,411,457 | 10/1983 | Inoue et al. | 285/54 |
| 4,706,737 | 11/1987 | Taylor et al. | 429/34 |

FOREIGN PATENT DOCUMENTS 718350  11/1954  United Kingdom .................. 285/54

Primary Examiner—Albert W. Davis, Jr.
Assistant Examiner—John K. Ford
Attorney, Agent, or Firm—William W. Jones

[57] ABSTRACT

An electrically insulated joint is provided between two fluid conduits, one of which is connected to a fuel cell stack, and the other of which is connected to a source of the fluid being circulated through the stack. The two conduits are both preferably formed from stainless steel, one of the conduits being larger than the other. An intermediate dielectric insulating sleeve is fitted onto the outside of the smaller conduit and extends beyond a free end thereof. The free end of the smaller conduit and a portion of the dielectric sleeve are expanded to the size of the larger conduit's bore and telescoped into the larger conduit's bore. The free end of the larger conduit is then shrunk down onto the outside surface of the unexpanded part of the dielectric sleeve and the smaller conduit. The resultant point has terminal cylindrical portions and an intermediate tapered portion.

1 Claim, 2 Drawing Sheets

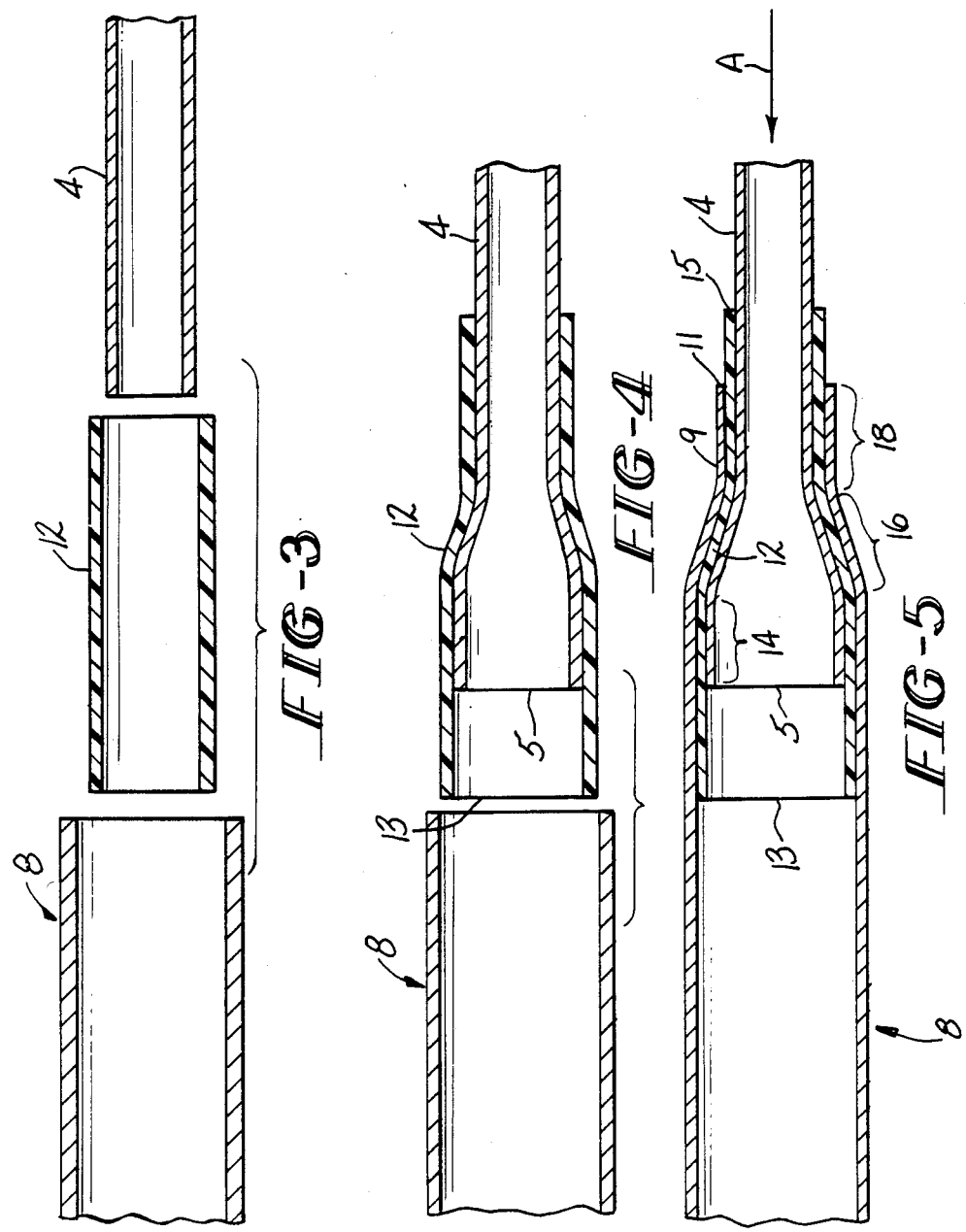

FUEL CELL STACK ELECTRICALLY INSULATED FLUID CONNECTOR

DESCRIPTION

1. Technical Field

This invention relates to a joint formed between interconnected fluid conduits in a fuel cell stack assembly. More particularly, this invention relates to a joint of the character described which is electrically insulated, and resistant to blow out from fluid pressure conditions in the stack.

2. Background Art

Fuel cell stacks are assemblies formed from a plurality of fuel cells stacked one atop the other, and electrically connected in series or in parallel, to produce electricity by electrochemical reaction of a hydrogen rich fuel, and an oxidant, typically air. Fuel cell stacks which have higher power outputs, will operate more efficiently under pressure, i.e. with the power section, reactants, coolant, etc. at elevated pressure. Such pressurized stacks must be contained in pressure vessels, and the various fluids used to operate the stacks such as the fuel, the air and whatever coolant is used must be brought into the stack from ambient surroundings. The reactant gases and coolant fluid, such as water, will typically be distributed to the components of the stack, i.e., the fuel cells and the cooling plate assemblies, by manifolds which are mounted on the sides of the power section, such as by strapping, clamping, or the like. These manifolds are necessarily electrically insulated from the power section of the stack. In the case of the water coolant manifolds, there will be an inlet manifold on one side of the stack and an outlet manifold on the opposite side of the stack. The cooling plate assemblies are dispersed throughout the stack so that one cooling plate assembly will cool about six to ten cells on either side of it. The coolant manifolds are connected to each of the cooling plate assemblies by means of dielectric connections so that the charge on the cooling plate assemblies is not transferred to the coolant manifolds. These manifolds are each provided with a plurality of tubular nipples, there being one for each cooling plate assembly. Each of the cooling plate assemblies are also provided with corresponding tubular nipples. The opposed nipples in each pair are interconnected by sleeves or hoses of dielectric material, such as polytetrafluoroethylene (PTFE) or the like. This type of construction is shown in U.S. patent application No. 932,849 Taylor et al, filed Nov. 20, 1986, now U.S. Pat. No. 4,706,737 issued Nov. 17, 1987. These passages which connect the manifolds and the cooling plates are relatively small, on the order of about one half inch in diameter, and as a result the dielectric sleeves are sufficiently strong to resist blow out from the pressurized coolant. The pressures experienced by these dielectric sleeves will typically be in the range of about 150 to about 300 psi, and the temperature will be in the range of about 350–400 F. The voltages which will be insulated at these sleeves for the cooling plates and manifolds will be up to about 500 V.

When a multi-stack power plant is used to produce larger amounts of electricity, the coolant water for the stacks will be circulated through all of the stacks from an external source of water. Thus the water will pass from an inlet line, which is outside of the pressure vessels of each stack through conduits which penetrate the pressure vessels of each stack. Coolant water leaves the stacks in a similar manner and passes into outlet lines outside of the pressure vessels. The coolant inlet and outlet manifolds are disposed inside of the stack pressure vessels, and the conduits which penetrate the vessels from outside are connected to conduits which derive from the coolant inlet and outlet manifolds. The conduits which connect the manifolds with external coolant circulation are much larger than the individual coolant plate nipples, having a diameter of about two inches. Since the same external water system services all of the stacks in the power plant, the electrical insulation between the manifold conduits and the external vessel penetrating conduits must be able to insulate against higher voltages in power plants where the stacks are connected in series, as for example up to 3,000 V. Prior to this invention, this insulating function was performed by large diameter sleeves made from a dielectric material such as PTFE or the like. These sleeves were clamped over the ends of the conduits to be connected, and required reinforcement with a non-conducting mesh or the like. These connecting sleeves are a weak link in the coolant circulation system in a multi-stack power plant, and high flow capacity drainage should be provided for each of the stack pressure vessels in case one of these connecting sleeves should burst.

DISCLOSURE OF THE INVENTION

This invention relates to an improved electrically insulated connection for use in the larger diameter feeder pipes to and from the coolant manifolds on the stack. The connection of this invention is formed by a tapered joint between two telescopingly related pipes, where a sleeve of dielectric material is sandwiched between the inner and the outer pipes and extends beyond the free ends of each pipe. One of the pipes is larger than the other in diameter, so that the small pipe can telescope into the bore of the larger pipe. The dielectric sleeve is fitted onto the outside of the smaller pipe with an end portion of the dielectric sleeve extending beyond the free end of the smaller pipe. The smaller pipe and sleeve are then expanded at their free ends to approximately the same diameter as the bore of the larger pipe. The expanded ends of the smaller pipe and sleeve are then inserted onto the bore of the larger pipe, and the free end of the larger pipe is then swaged down onto the outside of the smaller pipe. The free ends of the insulation sleeve will extend beyond the free ends of the smaller and larger pipes to guard against arcing. The tapered joint which is thus formed is much stronger than the prior art sleeve joint, and will not burst or separate at normal operating pressures of the stacks.

It is therefore an object of this invention to provide an improved electrically insulated connection for coolant pipes in a multi-stack fuel cell power plant.

It is a further object of this invention to provide an improved connection of the character described which is used for large diameter coolant flow pipes interconnecting water pipes outside of the stacks with coolant water manifolds inside of the stacks.

It is another object of this invention to provide an improved connection of the character described which can insulate against voltages of 3,000 V or higher.

It is an additional object of this invention to provide an improved connection of the character described which resists bursting at operating pressure of up to 300 psi and greater.

These and other objects and advantages of the invention will become more readily apparent from the following detailed description of a preferred embodiment thereof when taken in conjunction with the accompanying drawings, in which:

DESCRIPTION OF DRAWINGS

FIG. 3 is a fragmented sectional view of the components which are used to form the connection of this invention;

FIG. 4 is a view similar to FIG. 3 but showing the components after the first forming operation has been performed; and FIG. 5 is a sectional view showing the completed joint.

Figure 1:
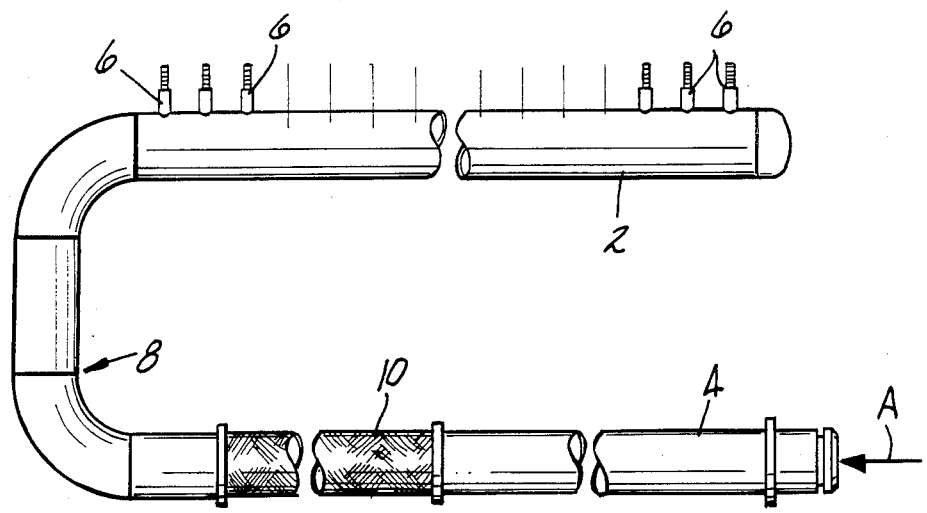
FIG. 1 is a fragmented side elevational view of the prior art connection between a coolant manifold and an outside feeder pipe which ducts coolant water to or from the manifold.

Referring now to the drawings, there is shown on FIG. 1 is the prior art connection between the water coolant manifold 2 and the coolant feed pipe 4 which penetrates the stack pressure vessel (not shown) and carries water to or from water conduits external to the stacks. The nipples on the manifold 2 are denoted by the numeral 6. The manifold shown is an inlet manifold, and is supplied with coolant water via its top end by a U-shaped pipe 8, the water flowing in the direction of the arrow A. The pipes 4 and 8 are interconnected by a dielectric hose 10 which is reinforced with a woven non-conducting mesh. The hose 10 is about twenty-four inches long and has an internal diameter of about two inches. The ends of the hose 10 are clamped or otherwise secured to the outside of the pipes 4 and 8. As previously noted, using a hose, even a reinforced hose, as a large diameter pipe connection with the length necessary to insulate against the 3,000 V potential creates a burst failure possibility when operating in the elevated temperature and pressure environment of a fuel cell stack.

Figure 2:
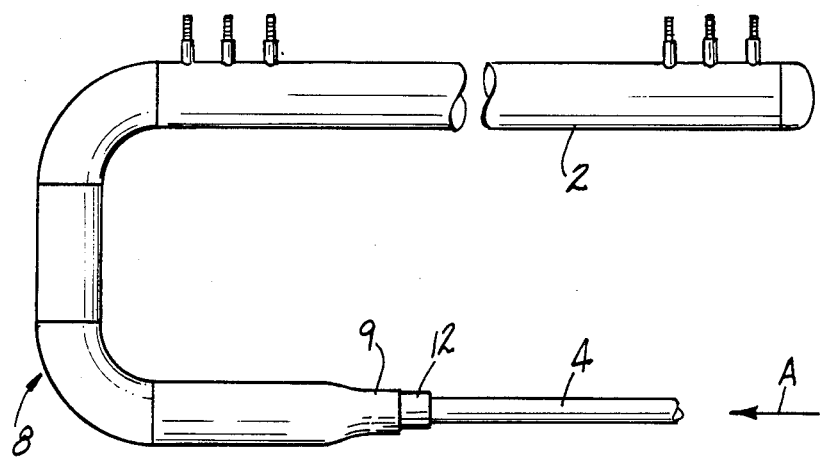
FIG. 2 is a view similar to FIG. 1 but showing a connection between the two pipes, which connection is formed in accordance with this invention.

FIG. 2 shows the improved connection of this invention. In the assembly shown in FIG. 2, the stainless steel coolant feed pipe 4 is preferably made with a smaller diameter than the stainless steel U-shaped pipe 8, so that the coolant water flows from the smaller pipe into the larger pipe. This relationship is not essential to the invention, but it is preferred for reasons which will be explained hereinafter. The smaller pipe 4 has mounted thereon a sleeve 12 of the dielectric insulating material, which may be PTFE or the like. The free end 9 of the U-shaped pipe 8 is necked down onto the pipe 4 and sleeve 12, while at the same time the free end of pipe 4 which is telescoped into the pipe 8 has been expanded to the bore diameter of the pipe 8, so that a double interlock is formed.

FIGS. 3–5 best illustrate details of the connection of this invention and the manner in which it is formed. In FIG. 3, the free ends of the pipes 4 and 8 are shown, along with the dielectric insulating sleeve 12. To form the connection, the sleeve 12 is fitted onto the smaller pipe 4 with a free end 13 of the sleeve 12 projecting beyond the corresponding free end 5 of the pipe 4. The ends 5 and 13 of the pipe 4 and sleeve 12 are expanded until the outside diameter of the sleeve end 13 is slightly less than the bore diameter of the pipe 8. The expanded ends 5 and 13 are then telescoped into the bore of the pipe 8 and the free end 9 of the pipe 8 is necked down onto the outside of the sleeve 12 and pipe 4. As shown in FIG. 5, the connection includes a first zone 14 of coextensive large cylindrical portions of the tube 8, sleeve 12, and tube 4; followed by a zone 16 of tapered coextensive portions of the tube 8, sleeve 12, and tube 4; and ending with a zone 18 of coextensive small diameter cylindrical portions of the tube 8, sleeve 12 and tube 4. The free end 13 of the sleeve 12 extends beyond the free end 5 of the pipe 4 to cover the adjacent surface of the bore of the pipe 8 to prevent arcing, and the opposite free end 15 of the sleeve extends beyond the free end 11 of the pipe 8 so as to overlie the adjacent outer surface of the pipe 4 also to prevent arcing. The direction of flow of the water is from the smaller pipe 4 into the larger pipe 8, per the arrow A, so as to eliminate any tendency for the water to peel away the sleeve end 13 from the surface of the bore of the pipe 8. The water flow thus tends to flatten the sleeve end 13 against the bore of the pipe 8.

It will be appreciated that the tapered overlapped zone of the connection practically ensures that rupture or parting of the connection cannot occur as a result of internal pressure, since the outwardly directed water pressure acting on the tapered zone will have an axially directed vector component which forces the connection together. The connection is of simple construction, easy to produce, and yet very stable. This connection allows simplification of the stack construction since the high flow capacity drainage for equipment protection will not have to be installed on the stack pressure vessels.

Since many changes and variations of the disclosed embodiment of this invention may be made without departing from the inventive concept, it is not intended to limit the invention otherwise than as required by the appended claims.

We claim:

1. An electrically insulated joint for supplying a fluid reactant to the power section of a fuel cell power plant, said joint comprising:

a. first tubular conduit for containing a pressurized fluid stream, said first conduit being of substantially constant diameter except for an integral end portion which is formed with a cylindrical terminal portion which is larger in diameter than the remainder of said first conduit, and a tapered medial portion joining said terminal portion with the remainder of the first conduit;

b. a second tubular conduit connected to said first tubular conduit as said joint, said second conduit having a constant diameter bore which is larger than said cylindrical terminal portion of said first conduit, said second conduit being telescoped over said first conduit with said cylindrical terminal portion of said first conduit being telescoped into the bore of said second conduit, and said second conduit having an integral cylindrical end part which has a bore diameter which is smaller than the constant diameter bore of the remainder of said second conduit, but larger than the outside diameter of said first conduit, said cylindrical end part being swaged onto a portion of said first conduit adjacent to said tapered medial portion thereof and said second conduit including a tapered medial part connecting said cylindrical end part of the second conduit with the remainder of the second conduit, said tapered medial part of said second conduit overlying said tapered medial portion of said first conduit; and c. a one piece smooth walled tubular sleeve of dielectric material sandwiched between overlapped parts of said first and second conduits, said sleeve including a first cylindrical end segment overlying the outside surface of said first conduit, said first cylindrical end segment extending over said first conduit beyond an end surface of said overlying cylindrical end part of said second conduit a distance sufficient to prevent arcing between the conduits, said sleeve also including a second enlarged cylindrical end segment having an outside diameter which substantially equals the bore diameter of said second conduit, said second cylindrical end segment being disposed within the bore of said second conduit and extending beyond the corresponding end surface of said cylindrical terminal portion of said first conduit a distance sufficient to prevent arcing between the conduits, and said sleeve further including a medial tapered segment extending between said first and second end segments and sandwiched between said tapered portion of said first conduit and said tapered part of said second conduit.

* * * * *